United States Patent [19]

McLaughlin

[11] 4,240,270
[45] Dec. 23, 1980

[54] ADJUSTABLE SPACERS FOR FLAT PLATE CONVEYORS

[75] Inventor: Thomas P. McLaughlin, Macedonia, Ohio

[73] Assignee: The Stouffer Corporation, Solon, Ohio

[21] Appl. No.: 33,555

[22] Filed: Apr. 27, 1979

Related U.S. Application Data

[62] Division of Ser. No. 832,168, Sep. 12, 1977, Pat. No. 4,180,987.

[51] Int. Cl.³ .......................... B30B 7/02; F25D 25/00
[52] U.S. Cl. ..................................... 62/341; 100/194; 248/188.2
[58] Field of Search ...................... 62/341; 248/188.2; 110/194, 199; 74/25, 567

[56] References Cited

U.S. PATENT DOCUMENTS

| | | | |
|---|---|---|---|
| 2,281,769 | 5/1942 | Hochriem | 248/188.2 |
| 2,653,240 | 9/1953 | Skekely | 74/25 |
| 2,780,488 | 2/1957 | Kennedy | 74/567 |
| 2,820,115 | 1/1958 | Rainey | 74/567 |
| 2,882,697 | 4/1959 | Amerio et al. | 62/341 |
| 2,993,345 | 7/1961 | Franklin | 62/341 |
| 3,020,731 | 2/1962 | Knowles | 62/341 |
| 3,155,030 | 11/1964 | Curtis | 62/341 |

*Primary Examiner*—Ronald C. Capossela
*Attorney, Agent, or Firm*—Meyer, Tilberry & Body

[57] ABSTRACT

A spacer bar and spacer for prepackaged food freezers of the multiple flat plate type which enables the spacing between the plates to be quickly changed to accommodate different thickness food packages. The spacer bar has a plurality of pairs of parallel sides, each pair being spaced a different predetermined amount whereby, by selectively rotating each spacer bar, the spacing between adjacent plates can be quickly changed. A spacer plate is further provided for adjusting the position of the stack of plates relative to the loading and discharge openings to accommodate changes in the overall height of the stack of plates caused by the different plate spacings.

8 Claims, 8 Drawing Figures

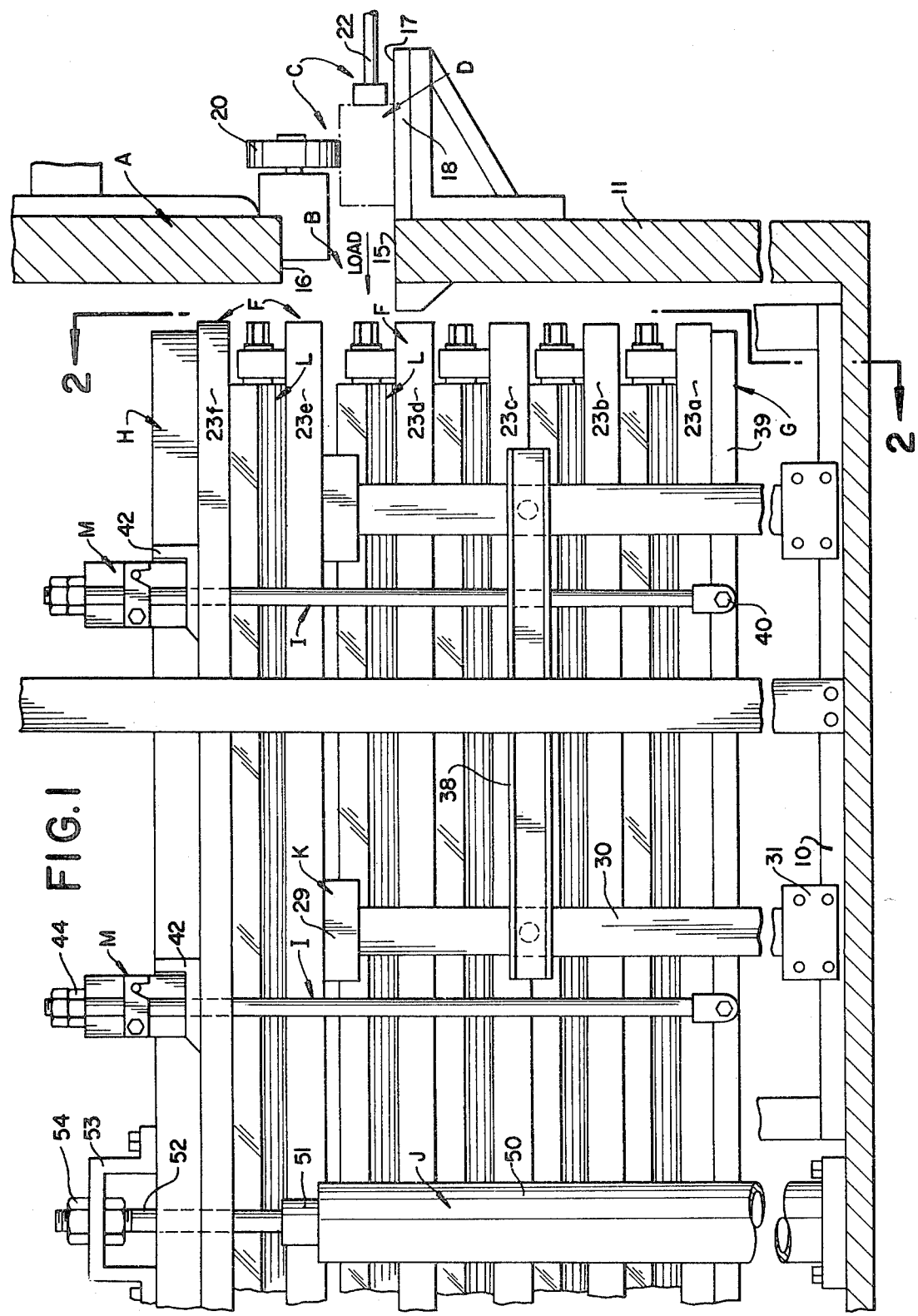

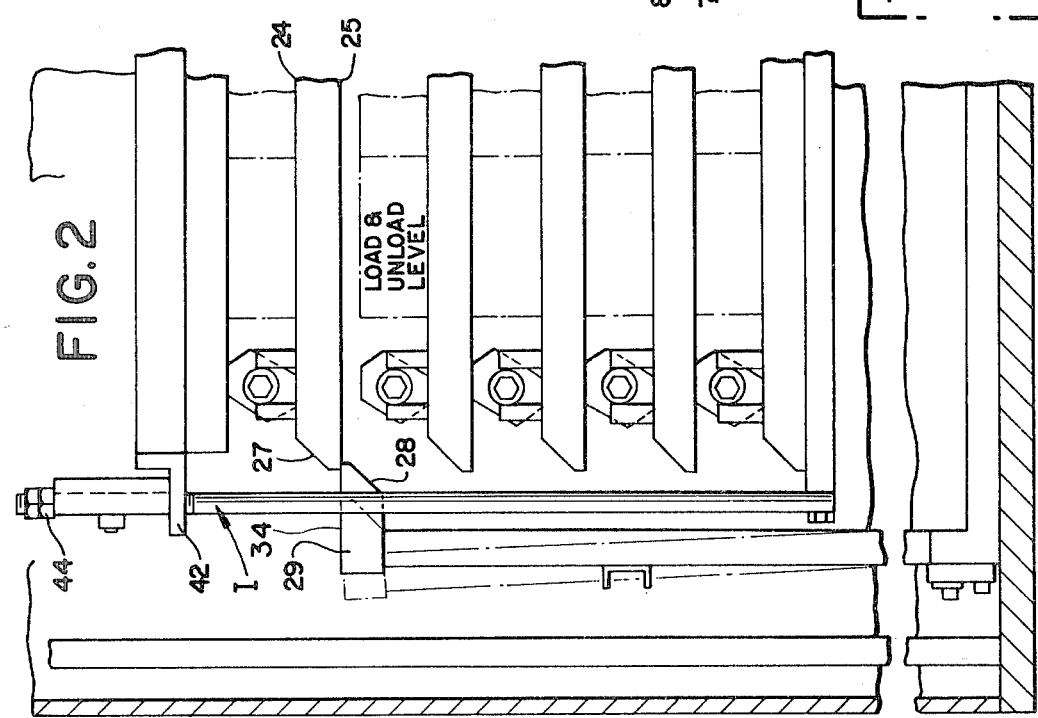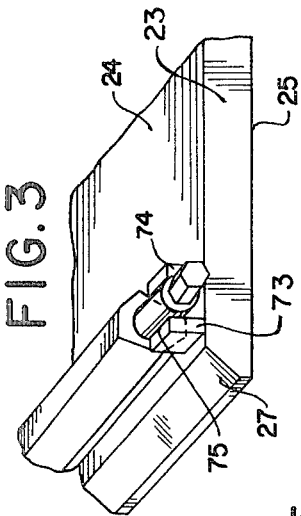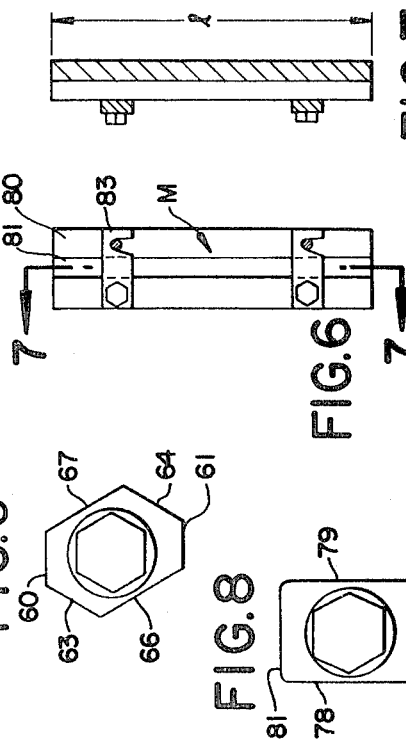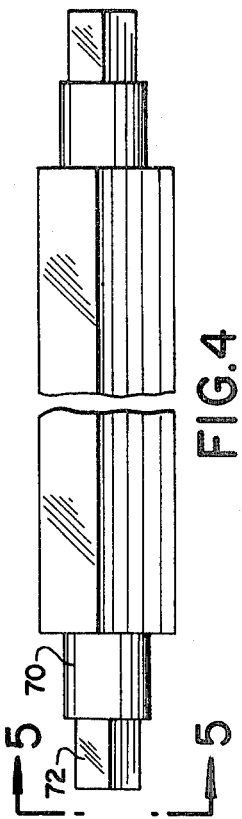

ADJUSTABLE SPACERS FOR FLAT PLATE CONVEYORS

This is a division of application Ser. No. 832,168 filed Sept. 12, 1977, now U.S. Pat. No. 4,180,987.

This invention pertains to the art of commercial food freezers and more particularly to a food freezer for prepackaged foods which must be frozen before being shipped to the customer.

In the art of prepackaged frozen foods, it is conventional to place the food either in the cooked, partially cooked, or raw state into a generally flat rectangular package and then to pass such package through a refrigerated area until such time as the food is completely chilled to the desired degree.

In one form of such refrigeration, the food packages are placed on a continuous belt which is then advanced through a large refrigerated compartment with blower fans which blow the chilled air over the packages until the food is properly chilled. In such types of freezers, the time required to freeze the food is unduly long and the volume of the freezer per pound of food frozen excessively large.

More recently, it has become conventional to provide a vertical stack of a plurality of spaced flat plates with spacer bars at the ends to space them a distance just equal to or slightly less than the thickness of the packages to be frozen. These plates are generally hollow and have refrigerant continuously passing therethrough to maintain them at the desired low temperature. The entire stack of plates is located within a large insulated housing having a horizontally elongated loading opening at one side and a horizontally aligned discharge opening on an opposite side.

The entire stack of plates with packaged food therebetween is then supported so as to be movable as a unit upwardly and downwardly so as to bring each space between respective pairs of plates sequentially into alignment with these loading and discharge openings.

In operation, the entire load of plates is raised a distance slightly greater than the spacing between adjacent plates whereby the upper one of the pair of plates defining the space to be aligned with the loading and discharge openings comes to rest on releasable latches and then the entire stack of plates below the space is lowered a distance so as to bring the upper surface of the lower plate defining the space into general alignment with the upwardly facing surfaces of the loading and discharge openings. With such an arrangement, rows of prepackaged unfrozen food can be sequentially pushed through the loading opening into the now open ended wide space which action forces a row of prepackaged food now frozen to discharge from the opposite end of the space through the discharge opening. This loading and discharging of unfrozen and frozen foods continues until by count all of the frozen food in the space has been replaced by unfrozen food. At this time, the entire stack of plates is raised upwardly so that the upper surfaces of the newly loaded packages comes into physical engagement with the plate resting on the latches and the cooling of these newly loaded packages may then commence. At the same time, the raising of the entire stack of plates is continued until the plate which formed the lower side of the previously loaded space passes beyond the latches at which time the next lower space is generally aligned with the loading and discharge openings. This movement is continued until the upper plate of the new space is supported on the latches at which time the stack of plates below the new space is lowered so that its upper surface is aligned with the upwardly facing surfaces of the loading and discharge openings.

One of the problems in such freezers has been that it is frequently necessary to change the spacing between all the individual plates to accommodate different thicknesses of packages. Heretofore, it has been necessary to operate the freezer through its cycle and as each pair of plates comes into a position corresponding to the load and unload position, the spacer bar is removed and a new different thickness spacer bar inserted in its place. At the same time, because the accumulative height of the stack of plates below the loading and discharge openings has changed, it has been necessary to adjust the position of stops in the form of nuts on a threaded shaft which act to support the entire set of plates so that when all of the new spacer bars are in position, the uppermost surface of the lower plate defining the space aligned with loading and unloading openings will be generally aligned with the upwardly facing surfaces of the loading and unloading passages. The changeover of a typical freezer oftentimes required five or six hours to change the freezer from one size thickness package to the other. During this time, the productivity of the freezer was completely lost.

The present invention contemplates a new and improved spacer arrangement for the plates of a commercial food freezer and a new and improved arrangement for positioning the upper surface of the lower plate defining the space aligned with the loading and discharge openings which overcome all the above referred to difficulties and others and enables a freezer to be converted from one size package to another without shutting down the freezer and normally for one man to effect the conversion during a lunch hour.

In accordance with the invention, a spacer bar is provided between the ends of each pair of plates having a plurality of pairs of flat parallel sides with each pair being spaced a different predetermined distance corresponding to the thickness of a package of food, the spacer bar being selectively rotatable to bring selected pairs of sides into abutting engagement with the plate surfaces to space such surfaces a distance equal to or just slightly less than the thickness of the packages of food to be frozen so that there will be good thermal contact between the top and bottom of each package and the plates.

Means on the plates coact with portions of the bars to prevent or limit transverse movement of the bars when they are rotated. Such means preferably comprise cylindrical cross sections at spaced points on the bars and upstanding lugs on each plate spaced a distance equal to the diameter of the cylindrical portions.

With a four sided spacer bar, two thicknesses of packages can be accommodated; with a six sided spacer bar three thicknesses of packages can be accommodated; with an eight sided bar four thicknesses of packages can be accommodated although it has been found that as the number of sides are increased, the overall maximum cross sectional dimension of the bar must increase such that normally six sides are believed to be the maximum which can be employed. In this respect, it is to be noted that the lower spacer bar in the stack of plates must at times carry not only the weight of all of the stack of plates but also of all of the food packages within the spaces between the plates.

Further in accordance with the invention, removable spacer members of predetermined dimensions are provided between the frame and the support for the stack of plates below the loading and discharge space whereby after the spacer bars are changed, the upper surface of the plate defining the bottom of the loading and discharge space will be generally aligned with the upper surfaces of the loading and discharge openings.

The principal object of the invention is a new and improved arrangement whereby a prepackaged food freezer of the space type may be quickly adjusted to accommodate different thicknesses of packages containing food to be frozen.

Another object of the invention is the provision of a new and improved spacer bar for the plates of a freezer whereby by simply rotating the bar, the plates may be spaced at different distances.

Another object is the provision of a spacer bar having a plurality of spaced parallel sides and spaced cylindrical portions of a diameter not greater than the minimum spacing between the sides in combination with means on the freezer plates for preventing or limiting sideward movement of the bar when it is rotating to change the spacing between adjacent plates.

Another object of the invention is the provision of a new and improved spacer member arrangement for automatically positioning the plates in the freezer so that the upper surface of the plate defining the loading and discharge space can be quickly aligned with the upwardly facing surfaces of the loading and discharge openings.

The invention may take physical form in certain parts and arrangements of parts, a preferred embodiment of which will be described in detail in this specification and illustrated in the accompanying drawings which form a part hereof and wherein:

FIG. 1 is a side elevational view of portions of the inside of a conventional, multiple, flat plate type, commercial food freezer with a preferred embodiment of the invention incorporated therein;

FIG. 2 is a cross sectional view of FIG. 1 taken approximately on the lines 2—2 thereof;

FIG. 3 is a fragmentary perspective view of a freezer plate and the spacer bar of the invention in assembled relationship therewith;

FIG. 4 is a side elevational view of the spacer bar of FIG. 3;

FIG. 5 is an end view of FIG. 4 taken on the line 5—5 thereof;

FIG. 6 is a side elevational view of the spacer member shown in FIG. 1 for compensating for variations in the total height of the stack of freezer plates;

FIG. 7 is a cross sectional view of FIG. 6 taken approximately on the line 7—7; and, FIG. 8 is an end view similar to FIG. 5 showing an alternative shape of the spacer bar.

Referring now to the drawings wherein the showings are for the purposes of illustrating a preferred embodiment of the invention only and not for the purposes of limiting same, FIGS. 1 and 2 illustrate generally a known commercial food freezer of the multiple flat plate type comprised generally of: a housing A having loading and unloading (not shown) openings B; mechanism C for advancing packages D of unfrozen food into loading position and then loading it into the freezer through opening B; a stack of vertically spaced, generally horizontally extending, freezer plates F inside of the housing; a bottom support member G for the stack of plates; an upper support member H; tie rods I extending between the upper and lower supporting plates G, H; hydraulic means J for raising and lowering the upper supporting plate H; latching means K for supporting the plates above the loading opening B with the plates above the loading opening being spaced from the plate immediately therebelow a distance greater than the thickness of the packages to be loaded into the space. In addition, in accordance with the invention, the figures show spacer bars L between the plates for determining their vertical spacing and spacer membes M for locating the upper surface of the plate immediately below the latching means supported plates relative to the loading and unloading openings B.

As indicated, the freezer is of a known type and will be described only in sufficient detail to enable an understanding of the present invention which, as indicated, pertains to spacer bars L and spacer members M.

The housing A rests on a base or foundation 10 and includes four vertically extending insulated side walls, only the front wall 11 being shown. This front wall 11 has the loading opening B formed therein which extends generally the entire length of the wall and is defined by an upwardly facing surface 15 and a downwardly facing surface 16 spaced a distance apart to pass the greatest thickness of food package D to be processed in the freezer. A conveyor platform 18 having an upper surface 17 generally alignes with the loading opening surface 15 is mounted on the outer surface of the wall 11. Packages of food D are slidingly supported on this surface 17.

An unloading opening (not shown) is located in an opposite parallel or rear wall (not shown) of the freezer and is generally horizontally aligned with the opening B.

The mechanism C includes a power driven roll 20 which advances food packages D in end to end relationship along the surface 17 and parallel to the front wall 11 and a pusher bar 22 which pushes a row of unfrozen food packages D as a group through the load opening B into the inside of the housing, this action taking place when the total length of aligned packages D in front of the loading opening B equals its width. As a row of packages D is pushed through the loading opening B, a row of now frozen packages is pushed through the unloading opening and onto a conveyor surface (not shown). This loading and unloading is continued until a complete layer of frozen packages has been discharged from the freezer and a layer of unfrozen packages have been fed thereinto.

The stack of freezer plates F is made up of a plurality of large flat rectangular plates 23a, 23b, 23c, 23d, 23e, 23f, ... 23n (reading upwardly from the bottom) and the spacer bars L. Each plate has upper and lower parallel surfaces 24, 25. The upper surface of each plate is spaced from the lower surface of the immediate above plate to define a space to receive a plurality of rows of food packages D. One known machine employs 27 plates to define 26 spaces. Each plate has a plurality of internal passages (not shown) through which a refrigerant is continuously circulated from a refrigerant source (not shown).

The spacer bars L hold the plates 23 in spaced relationship and are located adjacent the side edges of each plate and which side edges slope downwardly at an angle of approximately 45° as at 27 for coacting with a similarly angled but downwardly facing surface 28 of a latch member 29 of the latching means K.

Such latching means K are comprised generally of this latch member 29 mounted on the upper end of a vertically extending post 30 fastened at the bottom to the base 10 by loose coupling means 31 such that the latching member 29 may move laterally towards and away from the side edges of the plates 23. The latching member 29 has an upper surface 34 arranged to engage the lower surfaces 25 of each of the plates 23 when they are raised above the surface 34 and then lowered thereon. The downwardly facing angled surface 28 is engaged by the surface 27 whih pushes the latching member 29 outwardly as the stack of plates F is moved upwardly. Then the latching member 29 moves under the surface 25 of the adjacent plate (23e as shown in FIG. 1) to support all the plates above the latching member 29.

The latching means K normally includes two latching members 29 and posts 30 interconnected by a horizontally extending bar 38. Also, identical latching means K are provided at the opposite sides of the stack of plates F. It is to be noted that the surface 34 of the latch member 29 is located above the upwardly facing surface 15 of the loading opening B by an amount at least in excess of the maximum vertical thickness of the food packages D which will be processed in the freezer.

The stack of plates below the latching member supported plates 23e, 23f are carried by the lower supporting member G which is in the form of a large rectangular frame or plate 39. Plate 39 is suspended from tension rods I fastened at their lower ends to the plate 39 by means of bolts 40 and which rods extend upwardly through an opening in a bracket 42 fastened to upper supporting member H.

The tenson rods I are vertically movable relative to the bracket 42 and the upper support member H and have a nut 44 on the upper end forming an adjustable stop having a downwardly facing surface arranged to abut against an upwardly facing surface on the bracket 42. The position of nut 44 is adjusted so that when the surfaces are in engagement, the upper surface 24 of the plate 23 (in this instance, 23d) will be aligned with the upper surface 15 of the loading opening B.

In effect, the entire stack of plates F below latching member 29 is suspended from the upper supporting member H by means of the tie rods I, while the stack of plates above latching member 29 are supported by the latching means K.

The upper supporting member H is moved upwardly and downwardly by the hydraulic means J which generally include a pair of hydraulic cylinders 50 (one on each side of the stack) mounted at their lower ends on the base 10 and each having a piston 51 extending out of the upper end and connected to a piston rod 52 which is fastened to a bracket 53 by means of nuts 54. Bracket 53 is in turn fastened to the upper supporting member H. Thus, as hydraulic pressure enters hydraulic cylinder 50, the piston 51 moves upwardly which raises the upper supporting member H and with it through the tension rods I the lower supporting plate 39 and the entire stack of spaced plates F below the latching member 29. When the spacer bar L on plate 23d comes into contact with the lower surface 25 of the plate 23e then all the plates are supported by rods I and move upwardly with the piston 51.

The piston 51 has a stroke at least equal to the maximum height of the stack of plates F and bars L so that the lowermost of the plates 23a may be raised vertically upwardly until its upper surface 24 is generally aligned with the surface 15 of the loading opening B; and, lowered far enough so that the upper surface 24 of the plate 23e next below the top plate 23f is aligned with the surface 15.

The spacer bars L in accordance with the invention are so dimensioned and shaped that by simply rotating the bars through either 90° or 60° depending on the number of sides on the spacer bar, the spacing between the plates 23 may be readily and quickly changed. In the preferred embodiment shown in FIG. 4, the spacer bar is an elongated member having three pairs of spaced parallel sides 60, 61; 63, 64; and, 66, 67 with each pair of parallel sides being spaced a different amount corresponding to the thicknesses of food packages D to be processed in the freezer. Preferably, the sides 66, 67 are spaced approximately 1 3/16 inches, the sides 63, 64 1 ½ inches and the sides 60, 61 1 ⅝ inches.

Adjacent the ends of each bar L, there is a cylindrical portion 70, the diameter of which is at least less than the minimum spacing between any of the parallel surfaces of the bar and the end of the bar is provided with a rectangular or hexagonal portion 72 for coacting with a socket wrench so that the bar L can be rotated to bring any one of the three pairs of surfaces into engagement with the upper surface of the lower plate and engagable with the lower surface of the plate immediately above.

These bars L as shown, are supported on the fore and aft side edges of the plates 23 and each plate has a pair of rectangular bosses 73, 74 welded or otherwise fastened to the upper surface 24 and having vertically extending surfaces 75 spaced a distance apart just greater than the diameter of the cylindrical portion 70. These bosses are located on both the front and rear edges of the plates 23 and act to hold a bar L against lateral movement when it is rotated to bring different pairs of surfaces into operative relationship to space the plates 23.

FIG. 8 shows an alternative shape of bar wherein the bar has two pairs of spaced sides 78, 79; and 81, 82, which in the embodiment shown, are respectively spaced 1 ⅝ inches and 1 3/16 inches. Thus, the bar shown in FIG. 4 will accommodate three different thicknesses of food packages D while the bar shown in FIG. 8 will accommodate only two different thicknesses of food packages D.

In all cases, the spacing between the parallel sides is either equal to or just slightly less than the thickness of the food packages so that when a food package is positioned between the plates 23, the food packages will be firmly engaged by the respective adjacent surfaces of the plates 23.

To change the spacing between the plates so as to accommodate a different sized food package, the operator simply stands in front of the freezer as it operates and as the upper surface of each plate 23 comes into alignment with surface 15 of the loading or unloading opening, he places a wrench on the end of each pair of bars (which are then accessible through the opening), and rotates the bars through the appropriate angle to bring the proper pair of parallel sides into opposed relationship with the respective plates. The freezer may continue without a break in operation.

Once all of the spacer bars L have been rotated to the new position, the total combined height of all the plates and spacer bars will have changed. The spacer member M in accordance with the invention compensates for this total change in height so that the upper surface 24 of the plate 23 immediately below the plate supported by the latching members 29 will always be horizontally aligned with the upwardly facing surface 15 of the loading opening B. When the most widely spaced surfaces 60, 61 are positioned so as to space the plates 23, the nut 44 is adjusted so that when a surface 24 is aligned with surface 15, its lower surface rests directly on the upper surface of the bracket 42. However, when the other surfaces 63, 64 or 66, 67 are brought into operative engagement to space the plates 23, the total height of the stack of all the plates and bars will be reduced. So that the upper surfaces 24 of the plates 23 will be aligned with the surface 15 of the loading opening, the spacer member M is positioned between the lower surface of the nut 44 and the upper surface of the bracket 42. The vertical length of the spacer member M is predetermined and is equal to the number of spaces between plates 23 multiplied by the difference between the maximum spacing of the parallel sides of the bar and the spacing of the parallel sides of the bar to be employed to space the plates. Thus, if the bar shown in FIG. 4 is employed and the surfaces 66, 67 are used to space the plates 23 and there are 26 food receiving spaces between the plates 23, the length of the spacer member M will be equal to $(1\frac{3}{8} - 1\ 3/16) \times 26$ inches or $11\frac{3}{8}$ inches. If the surfaces 63, 64 are employed, the length of the spacer member M will be equal to $(1\frac{3}{8} - 1\frac{1}{2}) \times 26$ inches or $3\frac{1}{4}$ inches.

Obviously, with a greater or lesser number of plates 23, the length of the spacer member M must be correspondingly increased or decreased.

The spacer member M may take any number of different shapes but in the embodiment shown is comprised of an elongated flat plate 80 having a rectangular groove 81 extending vertically through its length of a depth and width just greater than the diameter of the tension rods I so that the spacer member M may fit around the tension rods I. Pivoted latch members 83 are provided which enable the member M to be assembled on the tension rod I and then locked in place. Obviously, other means may be employed to hold the member M in assembled relationship with the tension rods I.

Normally, after all of the spacer bars L have been rotated to a new position, the entire stack of plates F is lowered by releasing the pressure in the hydraulic cylinder 50 and the plates 39 allowed to come to rest on the base 10. At this point, the upwardly facing surface of the bracket 42 will be spaced from the downwardly facing surface on the nut 44 and the spacer member M may then be placed between the nut 44 and the bracket 42. Thereafter, the freezer is ready to continue freezing food packages of the new desired dimension. The entire changeover may take place in one complete cycle of the freezer without interrupting production and only using one person to effect the change.

Only two shapes of spacer bars have been shown. Obviously, a spacer bar with eight or even ten pairs of spaced parallel sides with each pair being spaced different amounts could be employed. As the number of sides is increased, the area of the sides facing the plates 23 must necessarily be reduced such that compressive failures of the bar can result due to the excessive forces imposed thereon particularly on the spacer bar spacing the lower plates in the stack of plates.

The invention has been described with reference to the preferred embodiment. Obviously, modifications and alterations will occur to others upon a reading and understanding of this specification and it is my intention to include all such modifications and alterations insofar as they come within the scope of the present invention.

Having thus described my invention, I claim:

1. A spacer bar for insertion between and spacing in vertically spaced parallel relation, throughout an effective length of the bar, the flat plates of a flat plate type conveyor, said bar being elongated and having at least two pairs of longitudinally extending, transversely spaced, flat parallel side surfaces, said surfaces having at least corresponding portions disposed within corresponding different sections of the bar located throughout substantially the full effective length thereof and the transverse spacing between each pair of surfaces being different, and said bar having at least one end shaped to provide means for rotating said bar about a longitudinal axis thereof.

2. The spacer bar of claim 1 wherein the said flat parallel side surfaces extend continuously throughout substantially the entire extent of the said effective length of the bar.

3. A spacer bar for insertion between and spacing in vertically spaced relation, throughout an effective length of the bar, the flat plates of a device for handling flat packages to be positioned flatwise between the plates, said bar being elongated and having at least three pairs of longitudinally extending, transversely spaced, flat parallel side surfaces, the transverse spacing between each pair of said surfaces being different than the transverse spacing between the other pairs thereof.

4. The spacer bar of claim 3 wherein at least one end of said bar has a portion of a maximum cross-sectional thickness no greater than the transverse spacing between the pair of said flat parallel surfaces having the minimum transverse spacing and shaped to provide tool-engaging means for selectively rotating said bar about a longitudinal axis thereof to bring different pairs of said surfaces into plate spacing position.

5. The spacer bar of claim 4 wherein said bar has cylindrical portions spaced along its length for coacting with said plates to prevent lateral movement of said bar when it is selectively rotated to bring different pairs of said flat parallel surfaces into spacing relationship with said plates, said cylindrical portions having a diameter no greater than the transverse spacing between the pair of said flat parallel surfaces having the minimum transverse spacing.

6. The spacer bar of claim 5 wherein both ends thereof are shaped to provide tool-engaging means and the bar is provided with two said cylindrical portions respectively located at the opposite ends of the bar immediately inwardly adjacent said tool-engaging means.

7. The spacer bar of claim 6 wherein the ends of the bar shaped to provide tool-engaging means are of hexagonal cross-sectional shape.

8. The spacer bar of claim 3 wherein said bar has cylindrical portions spaced along its length for coacting with said plates to prevent lateral movement of said bar when it is selectively rotated to bring different pairs of said flat parallel surfaces into spacing relationship with said plates, said cylindrical portions having a diameter no greater than the transverse spacing between the pair of said flat parallel surfaces having the minimum transverse spacing.

* * * * *